US012318799B2

(12) United States Patent
Rosenfeld et al.

(10) Patent No.: US 12,318,799 B2
(45) Date of Patent: Jun. 3, 2025

(54) GENERATION AND SPRAYING OF MICROSCOPIC WATER DROPLETS

(71) Applicant: RECLIME LTD., Bet Oved (IL)

(72) Inventors: Daniel Rosenfeld, Jerusalem (IL); Eliyahu Gamzon, Bet-Oved (IL); Victor Shenkar, Ramat-Gan (IL)

(73) Assignee: RECLIME LTD., Bet Oved (IL)

( * ) Notice: Subject to any disclaimer, the term of this patent is extended or adjusted under 35 U.S.C. 154(b) by 0 days.

(21) Appl. No.: 18/809,490

(22) Filed: Aug. 20, 2024

(65) Prior Publication Data

US 2024/0408628 A1 Dec. 12, 2024

Related U.S. Application Data

(63) Continuation of application No. PCT/IB2023/060244, filed on Oct. 11, 2023.

(Continued)

(51) Int. Cl.
*B05B 3/10* (2006.01)
*B05B 1/14* (2006.01)

(Continued)

(52) U.S. Cl.
CPC .............. *B05B 3/1021* (2013.01); *B05B 1/14* (2013.01); *B05B 3/082* (2013.01); *B05B 3/085* (2013.01); *B05B 3/105* (2013.01); *B05B 15/52* (2018.02)

(58) Field of Classification Search
CPC ......... B05B 3/1021; B05B 15/52; B05B 1/14; B05B 3/105; B05B 3/082; B05B 3/085; A01G 15/00

(Continued)

(56) References Cited

U.S. PATENT DOCUMENTS 3,346,192 A 10/1967 Hermann
4,089,120 A * 5/1978 Kozischek ............. A61Q 15/00 159/DIG. 27

(Continued)

FOREIGN PATENT DOCUMENTS

CN 113693047 A 11/2021
KR 102234837 B1 3/2021
WO 2024/100474 A1 5/2024

OTHER PUBLICATIONS

International Search Report for PCT/IB2023/060244 [dated: Feb. 13, 2024].

(Continued)

*Primary Examiner* — Steven J Ganey
(74) *Attorney, Agent, or Firm* — Momentum IP; Marc Van Dyke

(57) ABSTRACT

A method and system for generating and spraying massive amounts of microscopic water droplets with moderate power consumption; according to said method and system a body of water is subjected to fast rotation, and to associated centrifugal acceleration, which gives rise to strong hydrostatic pressure forcing said water to pass through dense microscopic meshes, so that from each hole in said meshes emanates a micro-jets of water; said micro-jets of water keep accelerating in the direction of centrifugal force and break up into a cloud of said microscopic droplets; forced air flow applied to said droplets pushes them out to the free atmosphere; ultrasonic cleaning, integrated into the main operational cycle, removes deposition constituents from the surface of said meshes, preventing their clogging and possible disruption of generation of said water droplets.

20 Claims, 6 Drawing Sheets

Related U.S. Application Data

(60) Provisional application No. 63/423,517, filed on Nov. 8, 2022.

(51) Int. Cl.
*B05B 3/08* (2006.01)
*B05B 15/52* (2018.01)

(58) Field of Classification Search
USPC ............... 239/2.1, 7, 14.1, 214, 222, 222.11, 239/222.13, 223, 224, 501, 502, 518, 520, 239/521, 523, 554, 591
See application file for complete search history.

(56) References Cited

U.S. PATENT DOCUMENTS

| | | | | |
|---|---|---|---|---|
| 6,631,851 | B1 * | 10/2003 | Adkins | B05B 3/1028 239/223 |
| 9,027,851 | B2 * | 5/2015 | Omiatek | B05B 7/2489 239/222 |
| 10,722,856 | B2 | 7/2020 | Zwiener | |
| 2014/0175188 | A1 * | 6/2014 | Nielsen | F26B 3/12 239/224 |

OTHER PUBLICATIONS

Written Opinion of the International Searching Authority for PCT/IB2023/060244 [dated: Feb. 13, 2024].

* cited by examiner

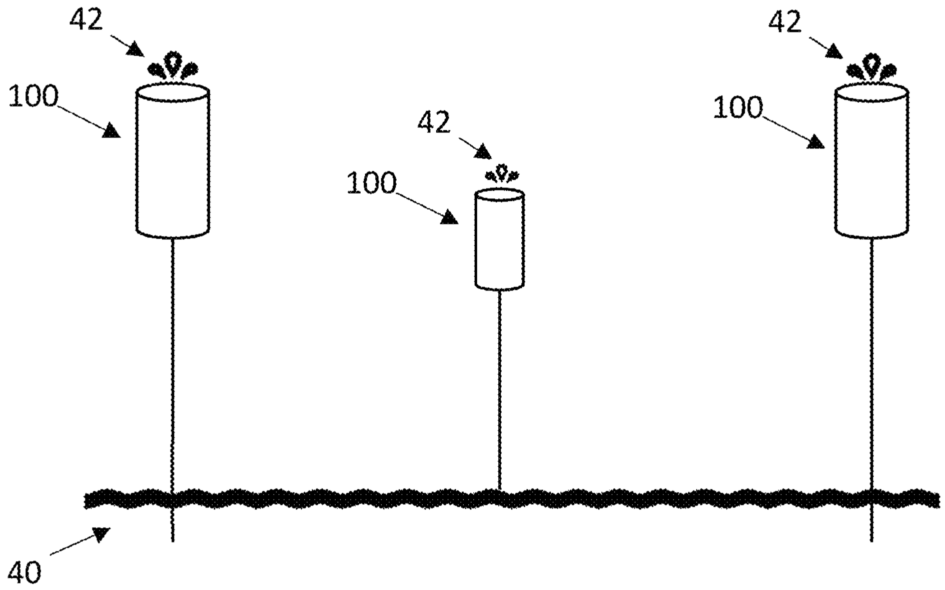

FIG. 7

Step S01 provide an apparatus 100 according to any of the disclosed embodiments, such that the central receptacle 21 is in fluid communication with a source of water 40

Step S02 activate the electric motor 31 to rotate the drum 11 at 20,000 rpm or more, a centrifugal force created by the rotating being effective to expel, through the array of holes 29, water received 40 in the central receptacle 21

FIG. 8A

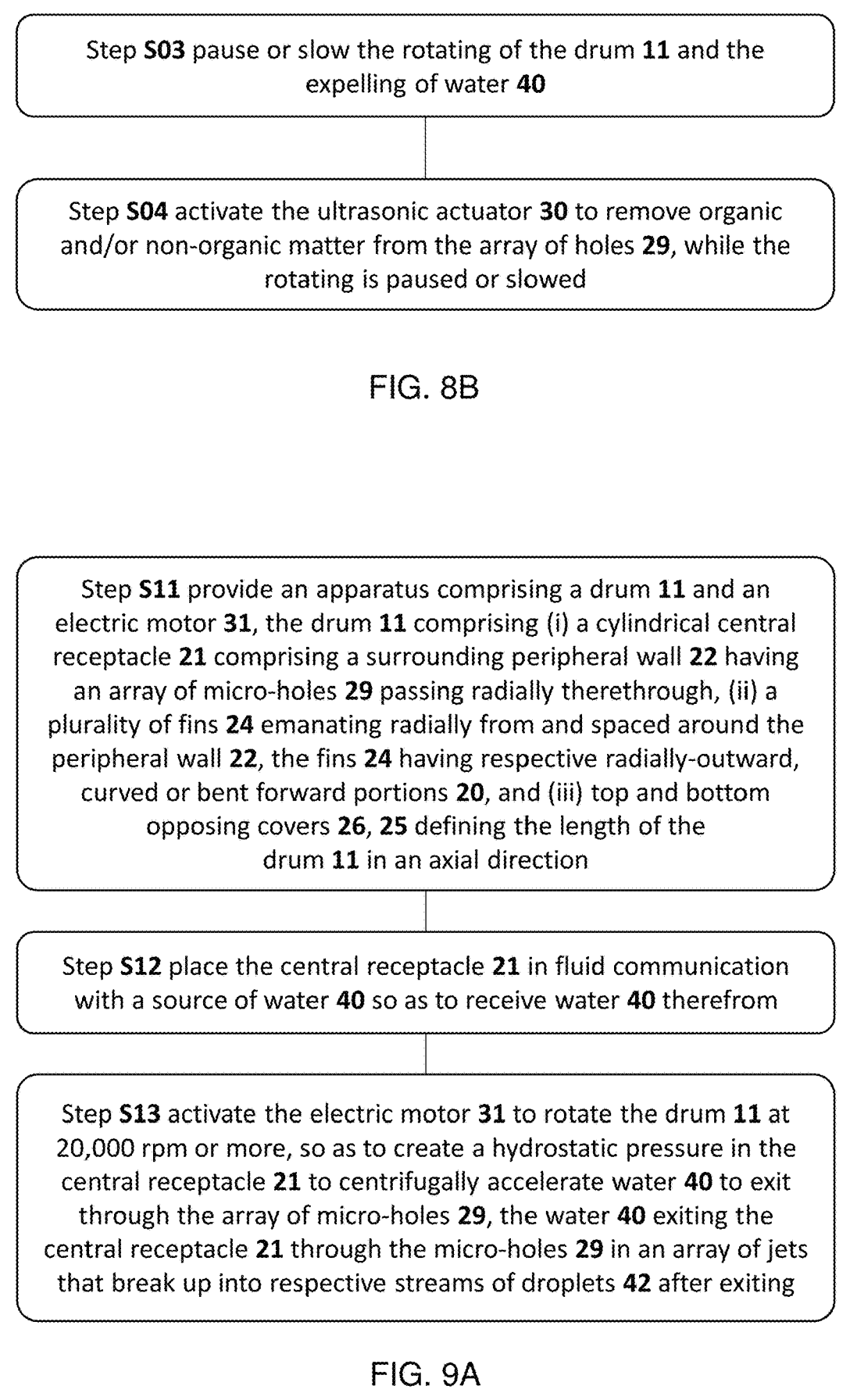

Step S03 pause or slow the rotating of the drum 11 and the expelling of water 40

Step S04 activate the ultrasonic actuator 30 to remove organic and/or non-organic matter from the array of holes 29, while the rotating is paused or slowed

FIG. 8B

Step S11 provide an apparatus comprising a drum 11 and an electric motor 31, the drum 11 comprising (i) a cylindrical central receptacle 21 comprising a surrounding peripheral wall 22 having an array of micro-holes 29 passing radially therethrough, (ii) a plurality of fins 24 emanating radially from and spaced around the peripheral wall 22, the fins 24 having respective radially-outward, curved or bent forward portions 20, and (iii) top and bottom opposing covers 26, 25 defining the length of the drum 11 in an axial direction Step S12 place the central receptacle 21 in fluid communication with a source of water 40 so as to receive water 40 therefrom Step S13 activate the electric motor 31 to rotate the drum 11 at 20,000 rpm or more, so as to create a hydrostatic pressure in the central receptacle 21 to centrifugally accelerate water 40 to exit through the array of micro-holes 29, the water 40 exiting the central receptacle 21 through the micro-holes 29 in an array of jets that break up into respective streams of droplets 42 after exiting

FIG. 9A

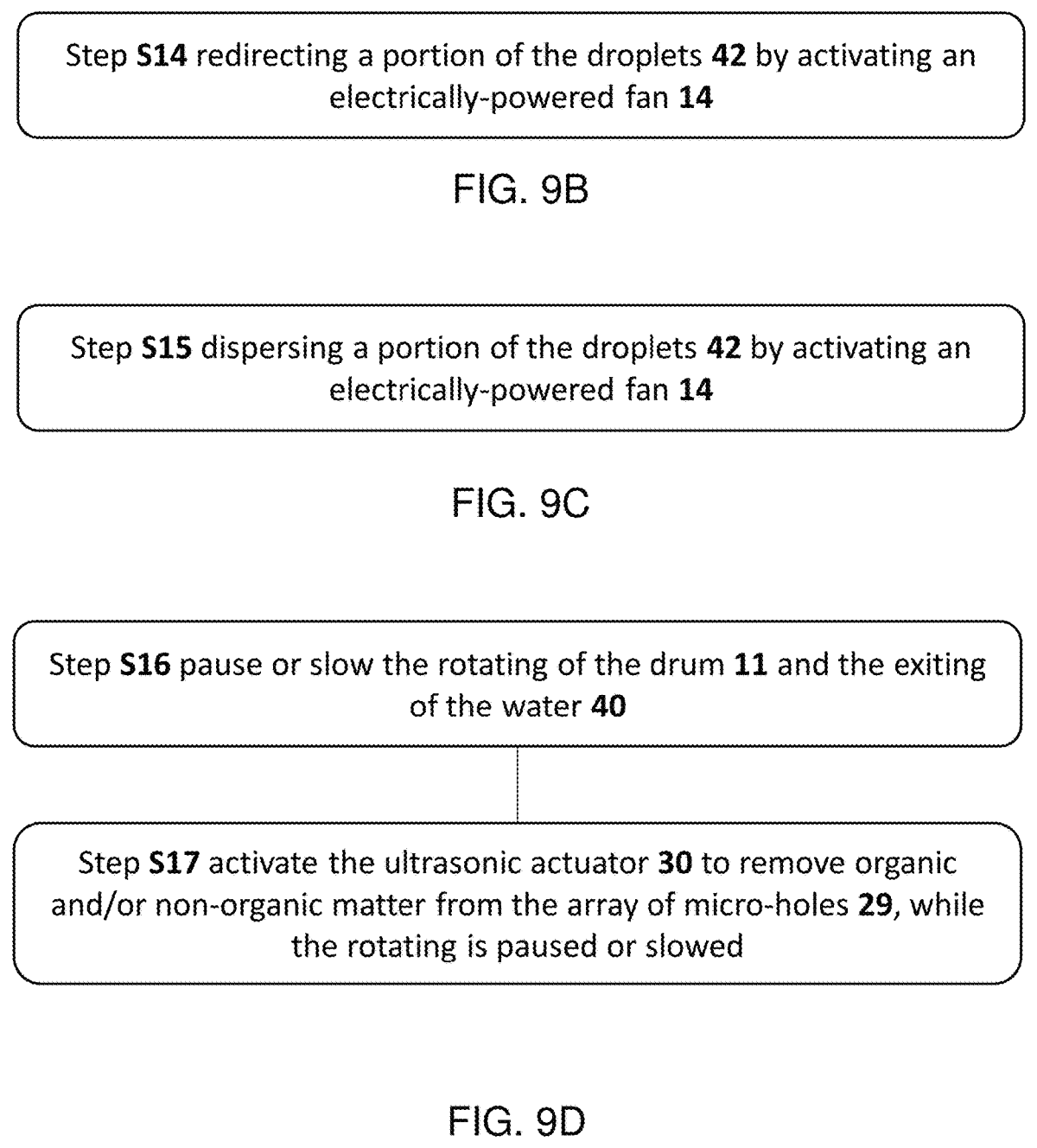

Step S14 redirecting a portion of the droplets 42 by activating an electrically-powered fan 14

FIG. 9B

Step S15 dispersing a portion of the droplets 42 by activating an electrically-powered fan 14

FIG. 9C

Step S16 pause or slow the rotating of the drum 11 and the exiting of the water 40

Step S17 activate the ultrasonic actuator 30 to remove organic and/or non-organic matter from the array of micro-holes 29, while the rotating is paused or slowed

FIG. 9D

GENERATION AND SPRAYING OF MICROSCOPIC WATER DROPLETS

CROSS-REFERENCE TO RELATED APPLICATIONS

This patent application is a continuation of PCT/IB2023/060244 which was filed on Oct. 11, 2023, and which is incorporated herein by reference in its entirety. PCT/IB2023/060244 claims priority to U.S. Provisional Patent Application No. 63/423,517, filed on Nov. 8, 2022, which is incorporated herein by reference in its entirety.

FIELD OF THE INVENTION

The present invention relates to breaking a body of water into a cloud of microscopic droplets, in general, and to a system and method that can effectively generate and spray massive amounts of such droplets with moderate power consumption, in particular.

BACKGROUND

The reduction of greenhouse gas emissions is no longer sufficient to prevent the devastating impact of global warming. That's why solar geo-engineering, dealing with reflection of some sunlight back to space, is gaining growing attention and support from the scientific community, governments, and public opinion.

Solar geoengineering solutions based on spraying microscopic saltwater droplets in the air low over the sea/ocean surface are the safest and most effective ways of achieving a cooling effect aimed at limiting or even reversing human-inflicted climate changes, especially on a local and regional scale. Such seawater droplets turn into sea salt aerosols, which reflect solar radiation directly, and/or absorb water vapor, enhancing the solar reflectance of clouds and leading to the desired cooling effect.

To this end, very large flow rates of water droplets, preferably measuring 1 to 5 microns in diameter must be generated. The required flow rates cannot be practically produced using the existing 'atomization' techniques. In one approach that has been suggested, water is to be forced by pressurized air to pass through spray nozzles with microscopic outlets—due to water surface tension, the outgoing water jets disintegrate into a cloud of droplets. In another approach that has been suggested, ultrasonic atomization is applied—meaning that a thin film of water flows over a fast-vibrating piezoelectric surface that breaks the water into microscopic droplets. Once a body of water is converted into a cloud of microscopic droplets, forced airflow is needed to the droplets away from the atomization device and into the 'free' atmosphere. The existing methods to generate and spray microscopic water droplets are unsuitable for achieving high enough flow rates needed for solar geo-engineering solutions—primarily, because an excessive number of atomization devices would have to be used, demanding impractically high levels of energy consumption.

Another major deficiency of the existing methods is the coalescence of the microscopic droplets (during their slow motion away from the atomization devices) into larger drops, degrading their ability to effectively reflect solar radiation.

SUMMARY

According to embodiments of the invention, an apparatus for producing water droplets for dispersal in the atmosphere comprises: (a) a drum configured to rotate at least in a first rotating direction, the drum comprising: (i) a cylindrical central receptacle comprising a surrounding peripheral wall having an array of holes passing radially therethrough, wherein at least 95% of the holes of the array have a respective maximum dimension of not more than 10 microns, (ii) a plurality of fins emanating radially from, and spaced around, the peripheral wall, the fins being shaped such that respective radially-outward portions thereof are curved and/or bent forward in the first rotation direction, and (iii) first and second opposing covers defining a length of the drum in an axial direction. The apparatus also comprises (b) an electric motor in mechanical communication with the drum, configured to rotate the drum in the first rotation. When the central receptacle is placed in fluid communication with a source of water, and the electric motor is activated in an operational mode to rotate the drum in the first rotation direction at a rotational speed of at least 20,000 rpm, water received in the central receptacle is expelled through the array of holes by a centrifugal force, and a presence of the shaped fins is effective to create an airflow in the first rotation direction that at least partly counteracts a Coriolis force deflecting the expelled water against the first rotation direction.

In some embodiments, the airflow created in the first rotation direction by the presence of the shaped fins can be effective to constrain the expelled water to a radially outward direction.

In some embodiments, the expelling of the water can be such that the expelled water exits the central receptacle through the respective holes in an array of jets that break up into respective streams of droplets after the exiting; the apparatus can be configured to generate, when in said operational mode, at least 200 billion droplets from each liter of water received in the central receptacle.

In some embodiments, it can be that at least 95% of the holes have a respective maximum dimension of not more than 5 microns and the apparatus is configured to generate, when in said operational mode, at least 1 trillion droplets from each liter of water received in the central receptacle. In some embodiments, it can be that at least 95% of the holes have a respective maximum dimension of not more than 2 microns and the apparatus is configured to generate, when in said operational mode, at least 10 trillion droplets from each liter of water received in the central receptacle. In some embodiments, it can be that at least 95% of the holes have a respective maximum dimension of not more than 1 micron and the apparatus is configured to generate, when in said operational mode, at least 100 trillion droplets from each liter of water received in the central receptacle.

In some embodiments, the apparatus can additionally comprise an electrically-powered fan arranged to spin coaxially with the drum; the fan can be effective to create, when the apparatus is in said operational mode, an axial airflow that changes a direction of the expelled water. In some such embodiments, the axial airflow can be effective to direct the expelled water away from the apparatus.

In some embodiments, the electric motor can be activatable in the operational mode to rotate the drum in the first rotation direction at a rotational speed of at least 30,000 rpm, or at least 40,000 rpm, or at least 50,000 rpm.

In some embodiments, at least 95% of the holes are displaced between 10 microns and 100 microns from a respective nearest hole.

In some embodiments, a method for producing water droplets for dispersal in the atmosphere can comprise: (a) providing the apparatus of any one of the embodiments disclosed hereinabove, such that the central receptacle is placed in fluid communication with the source of water; and (b) activating the electric motor to rotate the drum in the first rotation direction at a rotational speed of at least 20,000 rpm, a centrifugal force created by the rotating being effective to expel, through the array of holes, water received in the central receptacle. According to the method, the presence of the shaped fins can create an air flow in the first rotation direction that at least partly counteracts a Coriolis force deflecting the expelled water against the first rotation direction.

In some embodiments of the method, the water can comprise seawater. In some embodiments, of the method, the provided apparatus can be disposed over a body of water when the electric motor is activated. In some embodiments of the method, the provided apparatus can additionally comprise an ultrasonic actuator in fluid communication with the central receptacle, and the method can additionally comprise: (i) pausing or slowing the rotating of the drum and the expelling of water and (ii) while the rotating is paused or slowed, activating the ultrasonic actuator to remove organic and/or non-organic matter from the array of holes.

According to embodiments of the invention, an apparatus for producing water droplets for dispersal in the atmosphere comprises: (a) a drum configured to rotate at least in a first rotating direction, the drum comprising (i) a cylindrical central receptacle comprising a surrounding peripheral wall having an array of micro-holes passing radially therethrough, (ii) a plurality of fins emanating radially from, and spaced around, the peripheral wall, the fins being shaped such that respective radially-outward portions thereof are curved and/or bent forward in the first rotation direction, and (iii) first and second opposing covers defining a length of the drum in an axial direction; and (b) an electric motor in mechanical communication with the drum, configured to rotate the drum in the first rotation direction, so as to create a hydrostatic pressure when water is present in the central receptacle to centrifugally accelerate water through the array of micro-holes.

In some embodiments, the fins can be configured to create an air flow in the first rotation direction during rotation of the drum to at least partly counteract a Coriolis force deflecting streams of water existing the central receptacle through the array of micro-holes.

In some embodiments, the apparatus can additionally comprise an ultrasonic actuator in fluid communication with the central receptacle and configured to remove organic and/or non-organic matter from the array of micro-holes when electrically activated. The apparatus can be controllable to periodically pause or slow the producing of water droplets for a period of ultrasonic cleaning.

In some embodiments, the electric motor can be configured to rotate the drum at a rotational speed of at least 20,000 rpm, or at least 30,000 rpm, or at least 40,000 rpm, or at least 50,000 rpm.

In some embodiments, at least 95% of the micro-holes can have a respective maximum dimension of not more than 10 microns, or not more than 5 microns, or not more than 2 microns, or not more than 1 micron.

In some embodiments, it can be that respective radial distances between droplets increase when said droplets move outward in the radial direction at least within the rotating air between the fins.

A method is disclosed, according to embodiments of the invention, for producing water droplets for dispersal in the atmosphere. The method comprises: (a) providing an apparatus comprising a drum and an electric motor in mechanical communication therewith, the drum comprising (i) a cylindrical central receptacle comprising a surrounding peripheral wall having an array of micro-holes passing radially therethrough, (ii) a plurality of fins emanating radially from, and spaced around, the peripheral wall, the fins being shaped such that respective radially-outward portions thereof are curved and/or bent forward in a first rotation direction, and (iii) first and second opposing covers defining a length of the drum in an axial direction; (b) placing the central receptacle in fluid communication with a source of water so as to receive water therefrom; and (c) activating the electric motor to rotate the drum in the first rotation direction at a rotational speed of at least 20,000 rpm, so as to create a hydrostatic pressure in the central receptacle to centrifugally accelerate water to exit through the array of micro-holes, the water exiting the central receptacle through the respective micro-holes in an array of jets that break up into respective streams of droplets after the exiting.

In some embodiments, it can be that an air flow in the first rotation direction, created by a presence of the shaped fins, at least partly counteracts a Coriolis force deflecting the exiting water against the first rotation direction.

In some embodiments, the method can additionally comprise: redirecting a portion of the droplets by activating an electrically-powered fan. In some embodiments, the method can additionally comprise: dispersing a portion of the droplets by activating an electrically-powered fan.

In some embodiments, the provided apparatus can additionally comprises an ultrasonic actuator in fluid communication with the central receptacle, and the method can additionally comprise: (i) pausing or slowing the rotating of the drum and the exiting of the water and (ii) while the rotating is paused or slowed, activating the ultrasonic actuator to remove organic and/or non-organic matter from the array of micro-holes.

In some embodiments, it can be that a majority of the droplets are created by Rayleigh instability.

In some embodiments, water can exit the central receptacle at a rate of at least 0.5 liter of water per second. In some embodiments, water can exit the central receptacle at a rate of at least 1 liter of water per second.

In some embodiments, the rotating of the drum is at a rotational speed of at least 30,000 rpm, or at least 40,000 rpm, or at least 50,000 rpm.

In some embodiments, at least 95% of the micro-holes can have a respective maximum dimension of not more than 5 microns; the apparatus can be configured to generate, when in said operational mode, at least 1 trillion droplets from each liter of water received in the central receptacle.

In some embodiments, at least 95% of the micro-holes can have a respective maximum dimension of not more than 2 microns; the apparatus can be configured to generate, when in said operational mode, at least 10 trillion droplets from each liter of water received in the central receptacle.

According to embodiments, a method for generating and spraying massive amounts of microscopic water droplets with moderate power consumption comprises the following procedures: (a) use of a centrifugal acceleration forcing water stream to pass through rotating micro-nozzles, co-aligned with said centrifugal force; (b) use of very large arrays of rotating micro-nozzles whereas each micro-nozzle is a hole in dense, microscopic meshes; (c) use of specially shaped aerodynamic forces to counterbalance kinematic acceleration acting on micro-jets of water emanating from said rotating micro-nozzles to keep said micro-jets moving along the direction of centrifugal acceleration; (d) use of centrifugal acceleration acting on said micro-jets of water to make them break up into reduced size microscopic droplets and to increase spatial separation between them, preventing coalescence of said microscopic droplets into bigger drops of water; and (e) fully automated removal of sea water deposited constituents from the surfaces of said dense, microscopic meshes, preventing their clogging, is built into the main operational cycle.

According to embodiments, a system for generating and spraying massive amounts of microscopic water droplets with moderate power consumption comprises: (a) a rotating drum filled with water subjected to centrifugal acceleration forcing the water passing through micro-nozzles located on the peripheral wall of said rotating drum and being co-aligned with said centrifugal acceleration; (b) said rotating drum having a series of openings in its peripheral wall, which are covered with dense meshes bonded to its peripheral wall, wherein the microscopic holes in said meshes act as micro-nozzles from which emanate micro-jets of water; (c) a set of specially shaped fins externally attached to the peripheral wall of said rotating drum together with a propellor that forces an airflow around said rotating drum creating aerodynamic forces that counterbalance kinematic forces acting on said micro-jets of water to maintain their continuing motion in the direction of centrifugal acceleration; (d) propagation space around said rotating drum in which centrifugal acceleration acts to: (i) make said micro-jets of water thinner before they break up into reduced size microscopic droplets, and to (ii) prevent coalescence of said microscopic droplets into bigger drops of water; and (e) periodic stoppage of spinning motion of said drum to perform automated removal of sea water constituents from the surfaces of said meshes, by means of generating ultrasonic waves within the body of water filling said drum.

In some embodiments, it can be that respective radial distances between droplets increase when said droplets move outward in the radial direction at least within the rotating air between the fins.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIG. 7 shows a schematic illustration of a plurality of apparatuses operating over water, according to embodiments of the invention.

FIGS. 8A, 8B, 9A, 9B, 9C and 9D show flowcharts of methods and method steps for producing water droplets for dispersal in the atmosphere, according to embodiments of the invention.

Figure 1A:
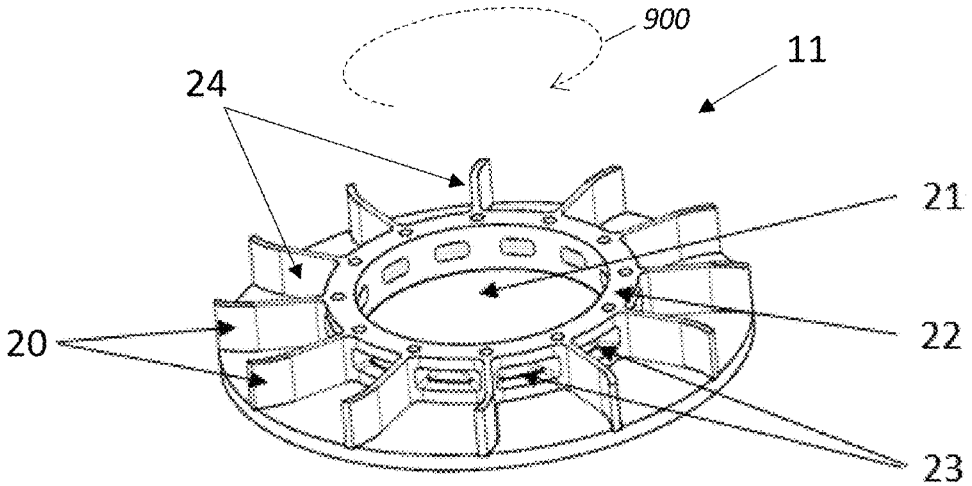
FIG. 1A is a schematic illustration of a drum of an apparatus for producing water droplets, according to embodiments of the invention.
Figure 1B:
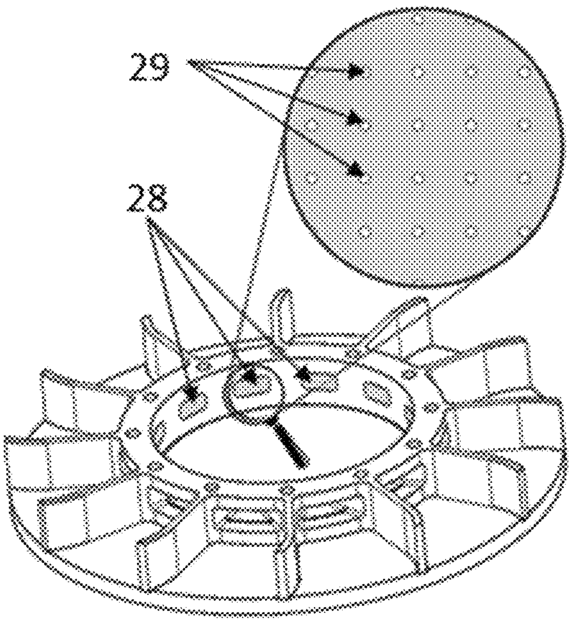
FIG. 1B shows a detail of the drum of FIG. 1, according to embodiments of the invention.
Figure 2:
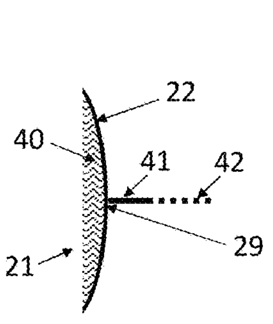
FIG. 2 is a schematic illustration of streams of water being ejected from a central cylinder of the drum, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous elements.

DETAILED DESCRIPTION OF THE EMBODIMENTS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

It is an object of the disclosed embodiments to provide a novel method and system for generating and spraying massive amounts of microscopic water droplets, while eliminating the bottlenecks and other limitations of the existing approaches mentioned above.

In accordance with some embodiments of the invention, the disclosed methods include the following procedures:

a. A body of water is subjected to fast rotation. The resulting centrifugal forces push the water to pass through fine meshes having holes that measure a few microns in diameter. This way each hole in the mesh becomes a micro-nozzle emanating micro-jets of water.
b. By properly balancing kinematic and aerodynamic forces acting on said micro-jets, their motion remains co-aligned with the direction of centrifugal acceleration, achieving two highly beneficial effects: (i) the microjets get thinner before they break up into respectively smaller droplets, (ii) the distance between individual droplets grows up thereby preventing their coalescence.
c. Use of fine meshes for breaking up the body of water (especially sea water) into microscopic droplets poses the danger of clogging said meshes with deposition of sea water constituents that may disrupt the continuity of the operational process. Therefore, a fully automated procedure of effectively clearing said meshes is built-in the main cycle of droplet generation and spraying.

In accordance with some embodiments, an apparatus for performing the disclosed methods includes the following parts and components:

a. The main part of the system is a rotating cylinder (the “drum” or the “rotating drum”). While being subjected to fast rotational motion, the rotating drum interior is fed with a stream of water. This spinning motion creates along the peripheral wall of the drum strong hydrostatic pressure forcing the water to pass through microscopic holes of a series of meshes inserted in small openings in the peripheral wall of the drum.

b. By using high density meshes, a relatively small size drum can produce millions of micro-jets (emanating from the holes in the mesh), resulting in very large flow rates of so-generated microscopic water droplets.

c. A miniature ultrasonic cleaner is integrated with the water feed allowing for periodic, fully automated cleaning cycles of said high density meshes.

d. An electric motor attached to the rotating drum (with moderate power rating) is used to spin the drum into fast rotational motion.

e. Another electric motor (with lower power rating) is used to rotate a propellor (fan) intaking outside air to generate airflow that forces the microscopic water droplets produced by the rotating drum to move out to the free atmosphere.

f. All the above components are installed inside a cylindrically shaped protective cover. Circular openings in the protective cover let the propellor (fan) intake outside air on one end, allowing forced air pushing the cloud of microscopic water droplets to exit to the free atmosphere on the opposite end.

The disclosed embodiments overcome the bottlenecks and other limitations of prior art by providing a method and a system for generating and spraying massive amounts of microscopic water droplets with moderate power consumption.

The disclosed embodiments have a myriad of applications ranging from solar geo-engineering solutions mentioned above, through greenhouse farming and dust control, and up to spreading protective coatings and lubrication.

We now refer to the figures and in particular to FIGS. 1A, 1B, 2 and 3.

According to embodiments, an apparatus for generation and dispersal of microscopic water droplets comprises a rotatable drum 11 configured to be rotated at high rotational frequency (rotational speed), e.g., at least 10,000 rpm, or at least 20,000 rpm, or at least 30,000 rpm, or at least 40,000 rpm, or at least 50,000 rpm. The drum 11 is configured, e.g., in geared or ungeared communication with an electric 33 motor, to rotate in the rotation direction indicated by arrow 900 in FIG. 1A.

The drum 11 comprises a central cylindrical receptacle 21 surrounded by a peripheral wall 22 characterized by an array of microscopic holes formed in the peripheral wall 22. In the non-limiting example of FIGS. 1A and 1B, a plurality of hole-containing meshes 28 are attached to respective windows 23 formed in the peripheral wall 22. In other examples, not shown, the holes 29 are formed in the peripheral wall 22 itself. The drum 11 is designed to receive water in the central cylindrical receptacle 21 when the central receptacle 21 is placed in fluid communication with a source of water. When the drum 11 is rotated as described above, water received in the central receptacle 21 is expelled, e.g., through the array of holes 29, by a centrifugal force generated by the rotation. In embodiments, at least 95% of the holes 29 of the array have a respective maximum dimension, e.g., a diameter, of not more than 10 microns. The expelled water exits the central receptacle 21 through the respective holes 29 in an array of jets 41, as shown schematically in FIG. 2. In embodiments, the jets 41 break up into respective streams of droplets 42 after the exiting, due to Rayleigh instability. Drops formed due to Rayleigh instability can have twice the diameter of the stream 41, i.e., of the holes 29. In operation, the rotating drum 11 is thus configured to generate, i.e., by expelling water that subsequently breaks up into droplets 42 after being expelled, at least 200 billion droplets from each liter of water received in the central receptacle 21.

In some embodiments, at least 95% of the holes have a respective maximum dimension of not more than 5 microns, in which case the rotating drum 11 is capable of generating at least 1 trillion droplets from each liter of water received in the central receptacle 21. In some embodiments, at least 95% of the holes have a respective maximum dimension of not more than 2 microns, and the drum 11 is configured to generate at least 10 trillion droplets from each liter of water received in the central receptacle 21. In some embodiments, at least 95% of the holes have a respective maximum dimension of not more than 1 micron, and the drum 11 is configured to generate at least 100 trillion droplets from each liter of water received in the central receptacle 21.

The drum 11 also comprises a plurality of fins 24 extending radially from the peripheral wall 22 of the central cylinder 21. Any number of fins can be used, e.g., 4, 6, 8, 10, 12, 14, 16, or more, or any intervening number, depending on design considerations. The fins 24 are shaped to have radially-outward portions 20 that are bent or curved forward, i.e., in the designated rotation direction 900. Each fin can be formed as a single member or as an assembly of members. In some designs, the fins include ribs or other elements to save material and/or strengthen the fins. In some embodiments, the radially-outward portion 20 can be made of a different material. The presence of the shaped fins 24 is effective to create an airflow in the rotation direction 900. This airflow at least partly counteracts a Coriolis force deflecting the expelled water against the rotation direction 900. In embodiments, this airflow is effective to constrain the expelled water to a radially outward direction, e.g., the direction shown in FIG. 2.

Figure 3:
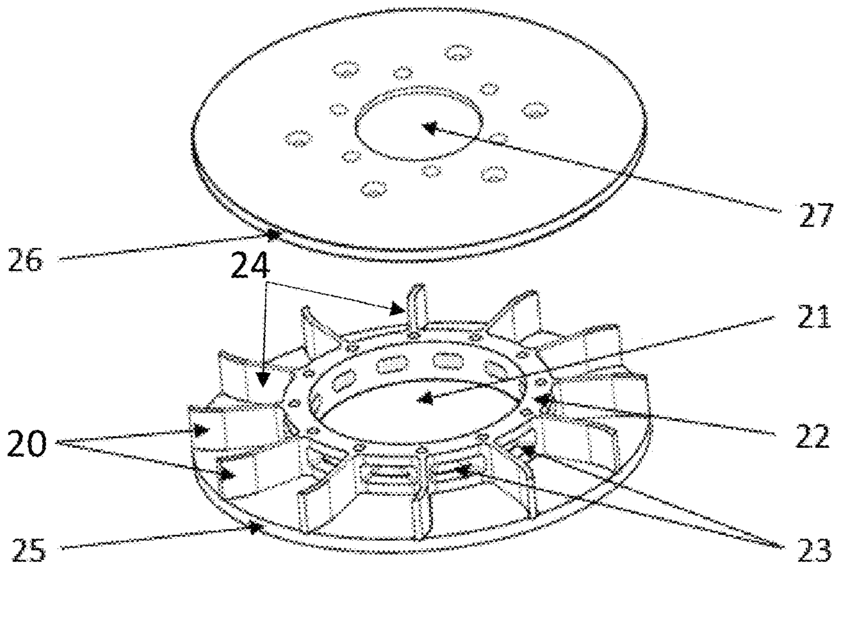
FIG. 3 shows the drum of FIG. 1 with top and bottom covers, according to embodiments of the invention.

In embodiments, the drum 11 also includes top and bottom covers 26, 25, as shown in FIG. 3 (where top cover 26 is shown in semi-exploded view).

Figure 4:
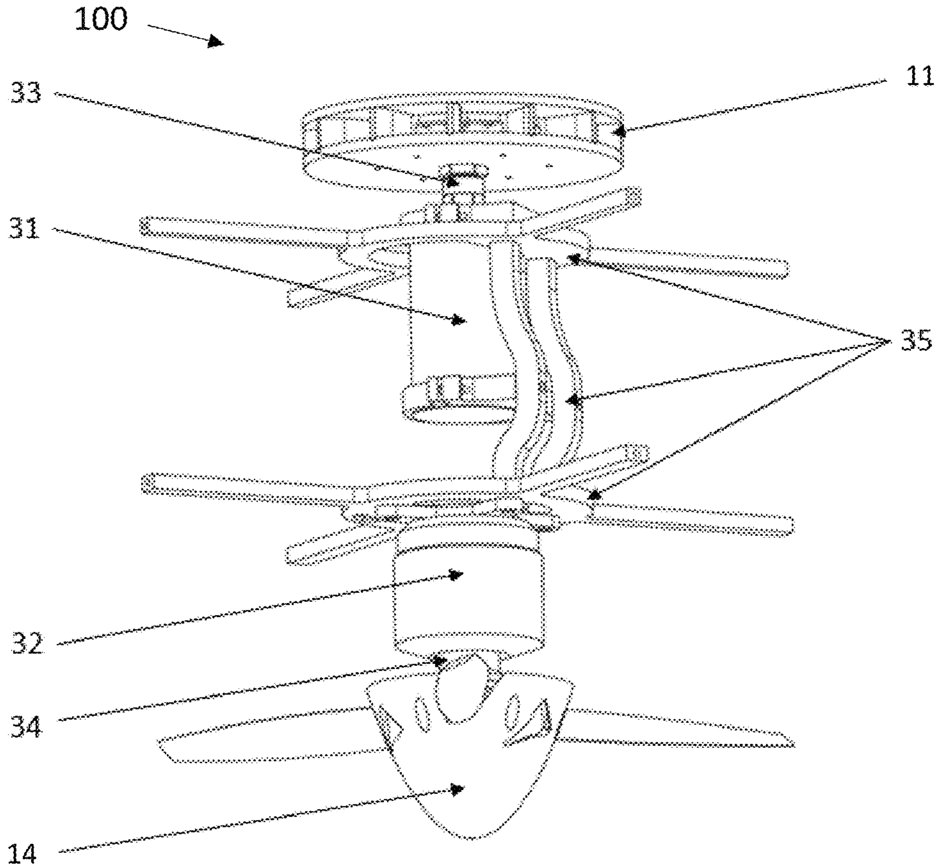
FIG. 4 shows a semi-exploded view of an apparatus for producing water droplets, according to embodiments of the invention.
Figure 5:
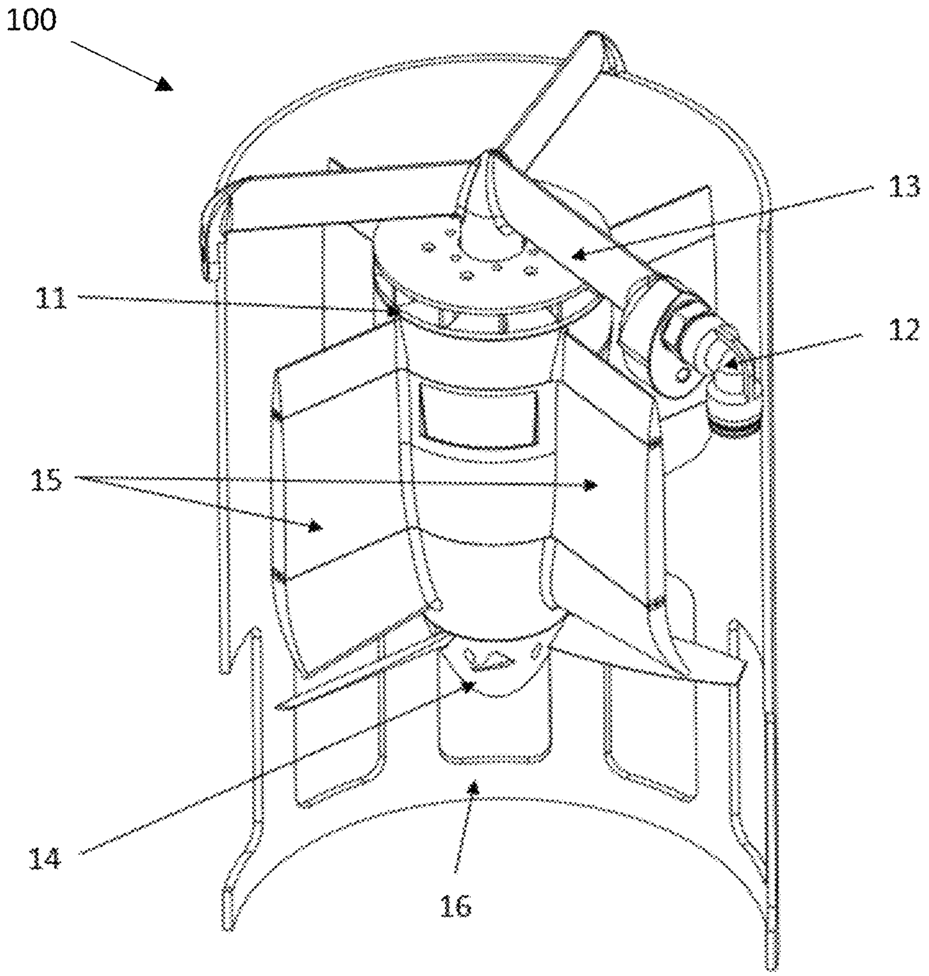
FIG. 5 shows a cutaway view of an apparatus for producing water droplets, according to embodiments of the invention.
Figure 6:
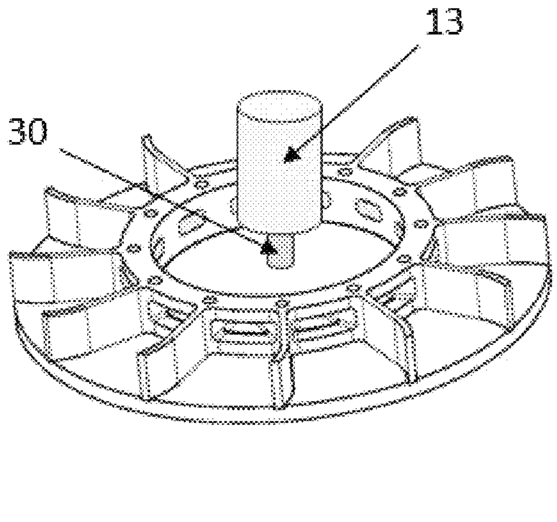
FIG. 6 shows a drum of the apparatus for producing water droplets in communication with an ultrasonic cleaning apparatus, according to embodiments of the invention.

We now refer to FIGS. 4, 5 and 6.

FIG. 4 shows components of an apparatus 100 for producing water droplets 42 for dispersal in the atmosphere. Not all components are present in every implementation of the embodiments.

In the non-limiting example of FIG. 4, the drum 11 is mechanically coupled to an electric motor 31 by a connector 33, e.g., a geared connection or an ungeared connection such as a drive shaft. In some examples, which are not illustrated, the motor is integrated with the drum 11 and a connector 33 is not required. Opposite the drum 11, e.g., below the drum 11, a fan 14 is arranged to spin coaxially with the drum 11. In some implementations, one or more fans, e.g., a linked array of 3 fans, can be provided and are not necessarily configured to spin coaxially with the drum 11. The fan 14 is arranged to create an axial airflow that changes the direction of the expelled water, i.e., in a direction away from the fan 14, and preferably into the atmosphere. As shown in FIG. 4, the fan 14 can be powered by, and mechanically coupled to, a second electric motor 32 by a connector 34, e.g., a geared connection or an ungeared connection such as a drive shaft. In other examples (not shown), the fan 14 can be arranged to be powered by the same electric motor 31 as the drum 11, e.g., with a transmission to account for the different rotation speeds between the drum 11 and the fan 14. In still other examples, the fan 14 is powered by an integrated electric motor 32 without a connector 34.

In embodiments, the drum 11, fan 14, and one or more electric motors 31, 32 are housed in a housing 16, shown in the cutaway view of FIG. 5. As shown in FIG. 5, an exemplary apparatus 100 comprises a water-delivery system including a valve 12 and delivery pipe 13 in fluid communication with the central cylindrical receptacle 21 of the drum 11. FIG. 5 also shows an array of one or more vanes 15 which are effective to channel the airflow created by the fan 14. One or more structural struts 35, shown in FIG. 4, can be used to brace the various components within the housing 16 and keep them stably in place during operation. In some embodiments, multiple drums 11 can be installed within a single housing 16.

In some embodiments, an apparatus 100 can include an ultrasonic actuator 30 (equivalently: ultrasonic cleaner) for periodic ultrasonic cleaning of the central cylindrical receptacle 21, the peripheral wall 22, window/openings 23 in the peripheral wall 22, meshes 28, and/or the array of micro-holes provided in the meshes 28 and or in the wall 22 itself. The ultrasonic cleaning arrangement can be used to keep the holes 29 and surrounding surfaces free from organic and inorganic substances, e.g., substances deposited from the water. As shown in FIG. 6, the ultrasonic cleaner 30 can be deployed within or in proximity to the water delivery pipe 13.

As shown in FIG. 7, the apparatus 100 can be deployed in arrays of multiple apparatuses, and over the surface of a body of water 40 so that water need not be transported to the apparatuses. It can be advantageous to deploy the apparatus 100 high above the water, e.g., at least 10 m, or at least 50 m, or at least 100 m above the water 40. In an example, the apparatuses can be spaced apart for effective coverage of droplet dispersal, by at least half a kilometer, or at least a kilometer, or at least two kilometers.

Referring now to FIG. 8, a method is disclosed for producing water droplets 42 for dispersal in the atmosphere, using any of the apparatuses 100 illustrated and/or described hereinabove. As shown by the flow chart in FIG. 8, the method comprises at least Steps S01 and S02.

Step S01 includes providing the apparatus 100 of any one of the preceding claims such that the central receptacle 21 is placed in fluid communication with the source of water 40. In some embodiments, the water 40 comprises seawater.

Step S02 includes activating the electric motor 31 to rotate the drum 11 in the first rotation direction at a rotational speed of at least 20,000 rpm. A centrifugal force created by the rotating is effective to expel, through the array of holes 29, water 40 received in the central receptacle 21.

According to the method, the presence of the shaped fins 24 creates an air flow in the first rotation direction that at least partly counteracts a Coriolis force deflecting the expelled water 40 against the first rotation direction.

In some embodiments, the method is performed when the apparatus 100 is disposed over a body of water 40 when the electric motor 31 is activated in Step S02.

In some embodiments, the method additionally comprises method steps S03 and S04, illustrated by the flowchart in FIG. 8B. In such embodiments, the apparatus 100 provided in Step S01 comprises (or, equivalently, additionally comprises) an ultrasonic cleaning actuator 30 placed in fluid communication with the central receptacle 21.

Step S03 includes pausing or slowing the rotating of the drum 11 and the exiting of the water.

Step S04 includes activating the ultrasonic cleaning actuator 30 to remove organic and/or non-organic matter from the array of holes 29 while the rotating is paused or slowed.

Referring now to FIG. 9A, a method is disclosed for producing water droplets 42 for dispersal in the atmosphere. As illustrated by the flow chart in FIG. 8, the method comprises at least Steps S11, S12, and S13.

Step S11 includes providing an apparatus 100 comprising a drum 11 and an electric motor 31 in mechanical communication therewith. According to the method, the drum 11 comprises: (i) a cylindrical central receptacle 21 comprising a surrounding peripheral wall 22 having an array of micro-holes 79 passing radially therethrough, (ii) a plurality of fins 24 emanating radially from, and spaced around, the peripheral wall 22, the fins being shaped such that respective radially-outward portions 20 thereof are curved and/or bent forward in a first rotation direction, e.g., an intended direction of rotation 900 of the drum 11, and (iii) first and second opposing covers 25, 26 defining a length of the drum 11 in an axial direction.

Step S12 includes placing the central receptacle 21 in fluid communication with a source of water 40 so as to receive water therefrom. Step S12 can be performed before, during or after Step S11.

Step S13 includes activating the electric motor 31 to rotate the drum 11 in the first rotation direction 900, i.e., the same direction of the curvature or bend of the radially-outward portions 20 of the fins 24, at a rotational speed of at least 20,000 rpm, so as to create a hydrostatic pressure in the central receptacle 21 to centrifugally accelerate water 40 to exit through the array of micro-holes 29, the water exiting the central receptacle 21 through the respective micro-holes 29 in an array of jets 41 that break up into respective streams of droplets 42 after the exiting. In some embodiments, a majority of the droplets 42 are created by Rayleigh instability. In some embodiments, water exits the central receptacle 21 at a rate of at least 0.5 liter of water per second. In some embodiments, water exits the central receptacle 21 at a rate of at least 1 liter of water per second. In some embodiments, the air flow in the first rotation direction, created by the presence of the shaped fins 24, at least partly counteracts a Coriolis force deflecting the exiting water 40 against the first rotation direction.

In some embodiments, the rotational speed is at least 30,000 rpm. In some embodiments, the rotational speed is at least 30,000 rpm. In some embodiments, the rotational speed is at least 50,000 rpm.

In some embodiments, the method additionally comprises method step S14, which is illustrated by the flowchart in FIG. 9B. As shown in FIG. 9B, Step S14 includes redirecting a portion of the droplets 42 by activating an electrically-powered fan 14.

In some embodiments, the method additionally comprises method step S15, which is illustrated by the flowchart in FIG. 9C. As shown in FIG. 9C, Step S15 includes dispersing a portion of the droplets 42 by activating an electrically-powered fan 14.

In some embodiments, the method additionally comprises method steps S16 and S17, illustrated by the flowchart in FIG. 9D. In such embodiments, the apparatus 100 provided in Step S11 additionally comprises an ultrasonic cleaning actuator 30 placed in fluid communication with the central receptacle 21.

Step S16 includes pausing or slowing the rotating of the drum 11 and the exiting of the water.

Step S17 includes activating the ultrasonic cleaning actuator 30 to remove organic and/or non-organic matter from the array of micro-holes 29 while the rotating is paused or slowed.

Any of the method steps disclosed herein can be combined with any other method steps, any such combinations being within the scope of the embodiments. In any of the disclosed methods, not all of the steps need be performed. Any of the steps of any of the disclosed methods can be combined in any way to create combinations not explicitly disclosed and any such combinations are within the scope of the invention.

Further Details of the Apparatus and Method

In embodiments, the apparatus 100 includes the following main components as shown in the figures: rotating drum 11, water valve 12 and pipe 13, which can be used to fill the inside volume of drum 11 with water 40, propeller, e.g., fan 14, intaking air from the free atmosphere to create forced air flow through vanes 15 into the space around the rotating drum 11 and out to the free atmosphere, and finally protective cover 16, which in addition to serving as an air duct for said forced air flow, also holds together all the above components.

The figures schematically depict further details of rotating drum 11 according to some embodiments. The inside volume of drum 11 serves as water container 21. Rotating drum 11 has on its peripheral wall 22 a series of openings 23 and a collection of specially shaped fins 24 externally attached to the same wall 22. Rotating drum 11 is enclosed with two covers: lower cover 25 and upper cover 26. Upper cover 26 has a circular hole 27 through which water 40 is fed into water container 21 and lower cover 25 with a circular joint that attaches rotating drum 11 to an electric motor driving its spinning motion. As schematically depicted in FIG. 1A, dense meshes 28 with holes 29 (measuring a few microns in diameter) are bonded from inside onto wall 22 to fully cover openings 23.

Fast rotation of drum 11 creates strong centrifugal forces, which give rise to hydrostatic pressure, pushing the water residing inside water container 21 toward wall 22. This hydrostatic pressure (which depends on the water depth inside water container 21 and on the rotational speed of drum 11) forces the water to pass through holes 29. This way from each hole 29 emanates a thin micro-jet of water having the same diameter as holes 29, whereas the hydrostatic pressure mentioned above determines the micro-jet ejection speed.

Each micro-jet breaks up (by the Rayleigh breakup process) into droplets of approximately twice the diameter of said micro-jets. Since the micro-jets are ejected from/to a rotating environment, a Coriolis force acts to deflect them against the direction of rotation. Forward bent fins 24 create an air flow in the direction of rotation which counterbalances the Coriolis force, maintaining the radial direction of motion of the micro-jets. The continued exertion of centrifugal acceleration on the micro-jets keeps stretching and making them thinner before they break up into respectively smaller droplets. As long as said water droplets move outward in the radial direction within the rotating air between the fins, their velocity increases in line with the increased centrifugal force at larger radial distances (with respect to the rotation center). This in turn increases the radial distance between said droplets. Since said droplets move radially outward, their tangential distance will also increase (in line with their radial distance). The above phenomena minimize the chance of collision and coalescence of said moving droplets of similar sizes. Otherwise, the coalescence of microscopic droplets into bigger drops could have seriously compromised their ability to effectively reflect solar radiation. Strong airflow generated by fan 14 (in a direction parallel to the rotation axis) pushes the cloud of said water droplets from around fins 24 out to the free atmosphere.

A set of actions occurs during periodic removals of sea water constituents that may clog the surfaces of dense meshes 28 (hereafter: "mesh cleaning"). To this end, the spinning motion of drum 11 is stopped so that miniature ultrasonic cleaner 30 inserted inside water feeding pipe 13, becomes partially submerged in water filled inside water container 21. Ultrasonic waves generated by ultrasonic cleaner 30 propagate through water inside water container 21 performing said mesh cleaning action.

According to embodiments, an electric motor 31 drives the spinning motion of rotating drum 11, an electric motor 32 drives the spinning motion of fan 14, and a set of mechanical elements is provided, comprising: (i) connector 33 tying electric motor 31 to rotating drum 11, (ii) connector 34 tying electric motor 32 to fan 14, and fixture 35 connecting electric motors 31 and 32 to protective cover 16.

Since drum 11 and fan 14 have a relatively small size and mass, a moderate power rating motor can be used for electric motor 31 and a low power rating motor can be used for electric motor 32, thereby setting the total power consumption of the disclosed system in the range of 2-5 kW, but not necessarily limited to this range.

It will be appreciated by persons skilled in the art that the disclosed embodiments are not limited to what has been particularly shown and described hereinabove.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a marking" or "at least one marking" may include a plurality of markings.

The invention claimed is:

1. An apparatus for producing water droplets for dispersal in the atmosphere, the apparatus comprising:

a. a drum configured to rotate at least in a first rotating direction, the drum comprising:
   i. a cylindrical central receptacle comprising a surrounding peripheral wall having an array of holes passing radially therethrough, wherein at least 95% of the holes of the array have a respective maximum dimension of not more than 10 microns,
   ii. a plurality of fins emanating radially from, and spaced around, the peripheral wall,
   iii. first and second opposing covers defining a length of the drum in an axial direction; and
b. a motor in mechanical communication with the drum, configured to rotate the drum in the first rotation, wherein when the central receptacle is placed in fluid communication with a source of water, and the motor is activated in an operational mode to rotate the drum in the first rotation direction at a rotational speed of at least 20,000 rpm, water received in the central receptacle is expelled through the array of holes by a centrifugal force, and a presence of the shaped fins is effective to create an airflow in the first rotation direction that at least partly counteracts a Coriolis force deflecting the expelled water against the first rotation direction.

2. The apparatus of claim 1, wherein the airflow created in the first rotation direction by the presence of the shaped fins is effective to constrain the expelled water to a radially outward direction.

3. The apparatus of claim 1, wherein the expelling of the water is such that the expelled water exits the central receptacle through the respective holes in an array of jets that break up into respective streams of droplets after the exiting, and the apparatus is configured to generate, when in said operational mode, at least 200 billion droplets from each liter of water received in the central receptacle.

4. The apparatus of claim 3, wherein at least 95% of the holes have a respective maximum dimension of not more than 5 microns and the apparatus is configured to generate, when in said operational mode, at least 1 trillion droplets from each liter of water received in the central receptacle.

5. The apparatus of claim 3, wherein at least 95% of the holes have a respective maximum dimension of not more than 2 microns and the apparatus is configured to generate, when in said operational mode, at least 10 trillion droplets from each liter of water received in the central receptacle.

6. The apparatus of claim 1, additionally comprising an—powered fan arranged to spin and create, when the apparatus is in said operational mode, an axial airflow that changes a direction of the expelled water.

7. The apparatus of claim 1, wherein the motor is activatable in the operational mode to rotate the drum in the first rotation direction at a rotational speed of at least 30,000 rpm, or at least 40,000 rpm, or at least 50,000 rpm.

8. The apparatus of claim 1, wherein at least 95% of the holes are displaced between 10 microns and 100 microns from a respective nearest hole.

9. The apparatus claim 1, wherein respective radial distances between droplets increase when said droplets move outward in the radial direction at least within the rotating air between the fins.

10. A method of producing water droplets for dispersal in the atmosphere, the method comprising:

a. providing the apparatus of claim 1 such that the central receptacle is placed in fluid communication with the source of water;

b. activating the motor to rotate the drum in the first rotation direction at a rotational speed of at least 20,000 rpm, a centrifugal force created by the rotating being effective to expel, through the array of holes, water received in the central receptacle, wherein the presence of the shaped fins creates an air flow in the first rotation direction that at least partly counteracts a Coriolis force deflecting the expelled water against the first rotation direction.

11. The method of claim 10, wherein the water comprises seawater.

12. The method of claim 10, wherein the provided apparatus is disposed over a body of water when the motor is activated.

13. The method of claim 10, wherein the provided apparatus additionally comprises an ultrasonic actuator in fluid communication with the central receptacle, and the method additionally comprises: (i) pausing or slowing the rotating of the drum and the expelling of water and (ii) while the rotating is paused or slowed, activating the ultrasonic actuator to remove organic and/or non-organic matter from the array of holes.

14. An apparatus for producing water droplets for dispersal in the atmosphere, the apparatus comprising:

a. a drum configured to rotate at least in a first rotating direction, the drum comprising (i) a cylindrical central receptacle comprising a surrounding peripheral wall having an array of micro-holes passing radially therethrough, (ii) a plurality of fins emanating radially from, and spaced around, the peripheral wall, (iii) first and second opposing covers defining a length of the drum in an axial direction; and b. a motor in mechanical communication with the drum, configured to rotate the drum in the first rotation direction, so as to create a hydrostatic pressure when water is present in the central receptacle to centrifugally accelerate water through the array of micro-holes, wherein at least 95% of the micro-holes have a respective maximum dimension of not more than 10 microns.

15. The apparatus of claim 14, wherein the fins are configured to create an air flow in the first rotation direction during rotation of the drum to at least partly counteract a Coriolis force deflecting streams of water existing the central receptacle through the array of micro-holes.

16. The apparatus of claim 14, additionally comprising an ultrasonic actuator in fluid communication with the central receptacle and configured to remove organic and/or non-organic matter from the array of micro-holes when electrically activated, wherein the apparatus is controllable to periodically pause or slow the producing of water droplets for a period of ultrasonic cleaning.

17. The apparatus of claim 14, wherein the motor is configured to rotate the drum at a rotational speed of at least 20,000 rpm.

18. The apparatus of claim 14, wherein at least 95% of the micro-holes have a respective maximum dimension of not more than 5 microns.

19. A method of producing water droplets for dispersal in the atmosphere, the method comprising:

a. providing the apparatus of claim 14;

b. placing the central receptacle in fluid communication with a source of water so as to receive water therefrom; and c. activating the motor to rotate the drum in the first rotation direction at a rotational speed of at least 20,000 rpm, so as to create a hydrostatic pressure in the central receptacle to centrifugally accelerate water to exit through the array of micro-holes, the water exiting the central receptacle through the respective micro-holes in an array of jets that break up into respective streams of droplets after the exiting, wherein water exits the central receptacle at a rate of at least 0.5 liter of water per second.

20. The method of claim 19, wherein water exits the central receptacle at a rate of at least 1 liter of water per second.

* * * * *